United States Patent
Cromer

(10) Patent No.: US 11,807,329 B1
(45) Date of Patent: Nov. 7, 2023

(54) MOTORCYCLE PLUG COVER

(71) Applicant: Figurati Designs, LLC, Northfield, OH (US)

(72) Inventor: Kerry T Cromer, Akron, OH (US)

(73) Assignee: Figurati Designs LLC, Macedonia, OH (US)

( * ) Notice: Subject to any disclaimer, the term of this patent is extended or adjusted under 35 U.S.C. 154(b) by 301 days.

(21) Appl. No.: 17/381,904

(22) Filed: Jul. 21, 2021

Related U.S. Application Data

(60) Provisional application No. 63/056,108, filed on Jul. 24, 2020.

(51) Int. Cl.
  *F16B 37/14* (2006.01)
  *B62J 23/00* (2006.01)

(52) U.S. Cl.
  CPC ............... *B62J 23/00* (2013.01); *F16B 37/14* (2013.01)

(58) Field of Classification Search
  CPC . F16B 37/14; F16B 41/005; F22B 7/16; B62J 23/00; Y10S 411/91
  USPC ............ 411/372.5, 374, 376, 429, 431
  See application file for complete search history.

(56) References Cited

U.S. PATENT DOCUMENTS

| | | | |
|---|---|---|---|
| 5,505,465 A * | 4/1996 | Hornsby | F16J 15/3464 277/374 |
| 6,105,700 A * | 8/2000 | Williams | B62K 25/283 180/219 |
| 6,983,998 B2 | 1/2006 | Litzka | |
| 7,703,787 B2 * | 4/2010 | Kawamura | B62K 25/283 280/288 |
| 7,713,012 B2 * | 5/2010 | Coonjohn | B60R 13/005 411/372.6 |
| 2020/0173483 A1* | 6/2020 | Tamm | F16B 31/021 |

\* cited by examiner

*Primary Examiner* — Roberta S Delisle

(57) ABSTRACT

A motorcycle plug cover having a cup-shaped body with a cylindrical wall and a continuous annular groove for receiving engagement with an O-ring gasket. The body has a curved external cap surface with an edge extending beyond the cylindrical wall and beyond an external surface of the rubber O-ring gasket when engaged within the continuous annular groove in the cylindrical wall. Spring openings are formed through the cylindrical wall arranged in pairs and on opposite sides of the cylindrical wall, each for receiving and engaging a spring ball plunger that is secured within a one of the spring openings. The cup-shaped body has a curved external cap surface supporting a decorative design.

9 Claims, 3 Drawing Sheets

MOTORCYCLE PLUG COVER

CROSS-REFERENCE TO RELATED APPLICATIONS

This application claims the benefit of U.S. provisional patent application Ser. No. 63/056,108 filed on Jul. 24, 2020, the entire contents of which is incorporated herein by reference.

FIELD OF INVENTION

The present application provides an improved plug cover, and more particularly for a decorative metal cover for a motorcycle swingarm fastener.

BACKGROUND

To attach the rear wheel of a motorcycle to the motorcycle body, a swingarm is used, that allows the rear wheel to pivot vertically. While a variety of swingarm styles are used with different motorcycle designs, many are bolted to the motorcycle body or frame, through openings formed on one end of the swingarm.

The openings formed through the swingarm are often provided as recessed openings, with a bolthole for receiving a bolt or pivot bolt, centered within the recessed opening through the end of the swingarm, either on one or both sides of the swingarm. Such recessed openings form a housing for the bolt head, and when covered, provide protection for the bolt head by preventing road dirt, grime, debris and moisture from settling within the recessed opening and on the bolt head within the pivot bolt area.

In the past, such swingarm openings have been uncovered or covered using plastic covers to cover the bolt head. The use of plastic materials for such covers or plugs enabled the resilient nature of the material itself to be used, either by press fit engagement or using flexible legs, to retain the plastic cover within the recessed openings.

Unfortunately, such plastic covers were not particularly attractive, and were not securely retained within the recessed opening. Plastic covers have been found to leak, come loose, fall off and become lost while riding. For avid motorcycle enthusiasts, a more reliable and attractive cover is desired.

SUMMARY OF INVENTION

The present application provides a more reliable and attractive plug cover to engage securely a recessed opening in a motorcycle swingarm, or the pivot bolt area. The plug cover comprises a cup-shaped stainless steel body. The body has a cylindrical wall with at least one groove formed for receiving engagement by at least one O-ring gasket. The body has a curved external cap surface with an edge extending beyond the cylindrical wall and beyond the external surface of the O-ring when engaged within the groove in the cylindrical wall.

The plug cover is securely engaged within the recessed opening in a motorcycle swingarm by a plurality of metal springs, and preferably stainless steel spring ball plungers. The spring ball plungers comprise a cup-shaped cylindrical plunger body having an internal spring biasing a ball bearing out one end of the plunger body. Each cylindrical plunger body of the spring ball plunger is welded within an opening formed through the cylindrical wall of the plug cover body. At least two spring ball plungers should be provided extending from opposite sides of the plug cover cylindrical wall to secure the plug cover within the swingarm recessed opening. However, in the preferred embodiment four spring ball plungers are welded in position within the cylindrical wall, with each located opposite another plunger. The spring ball plungers, together with the O-ring gasket, ensure that the plug cover remains securely engaged within the recessed opening of the swingarm to resist dirt, grime and moisture from moving past the cap surface and into the recessed opening of the pivot bolt area.

The curved external cap surface of the stainless steel plug cover may also be provided with any desired decorative design. The external cap surface is curved to form a shallow dome-shaped cover as the closed surface of the cup-shaped body. The shallow curvature of the external cap surface directs moisture off and away from the plug cover. While a plain metal surface appearance may be provided on the external curved cap surface, any desired motorcycle logo or other preferred personalized design, including color designs using an enamel process, are also possible. Such personalized aftermarket accessories are highly desirable to avid motorcycle enthusiasts wishing to personalize features of their motorcycles.

DETAILED DESCRIPTION

Figure 1:
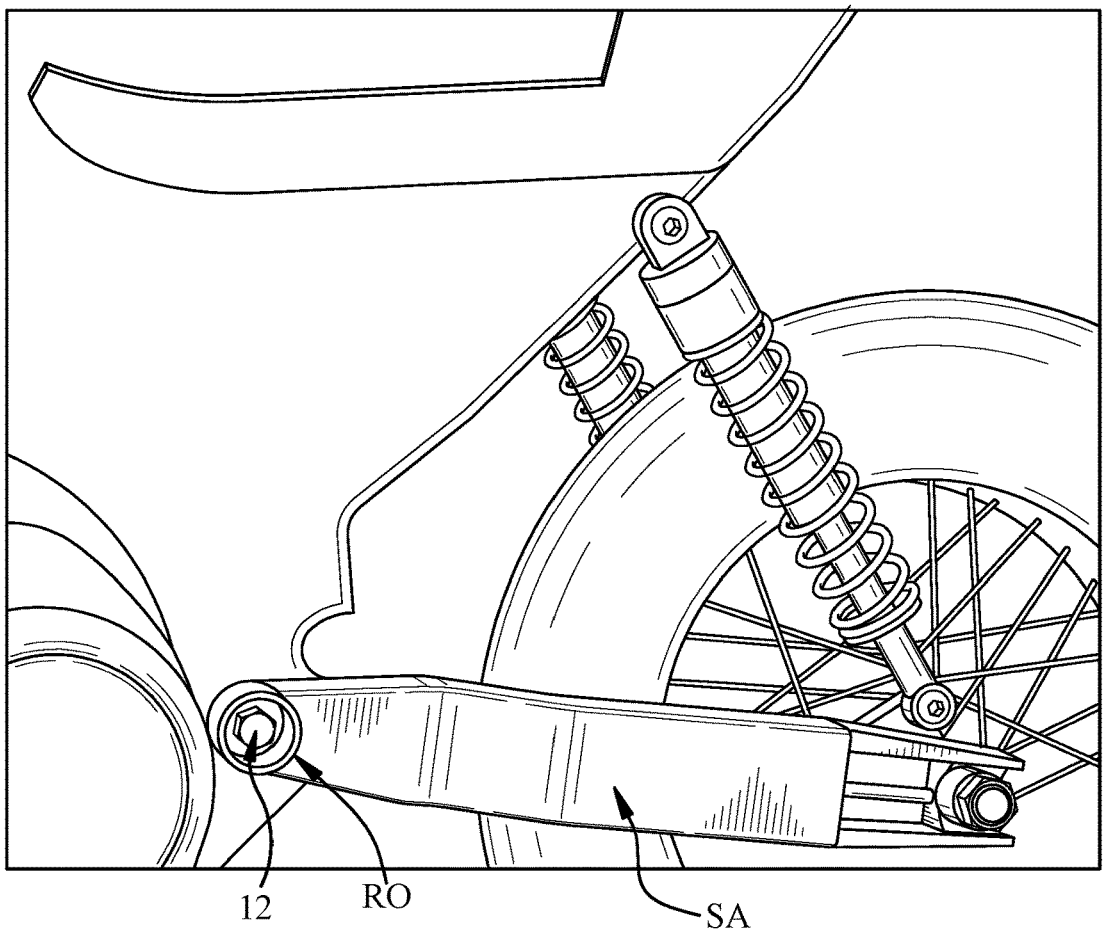
FIG. 1 schematically illustrates a partial rear motorcycle wheel shown with a new swingarm bolted to a motorcycle frame at a pivot bolt, shown uncovered within a recessed opening forming the pivot bolt area.
Figure 2:
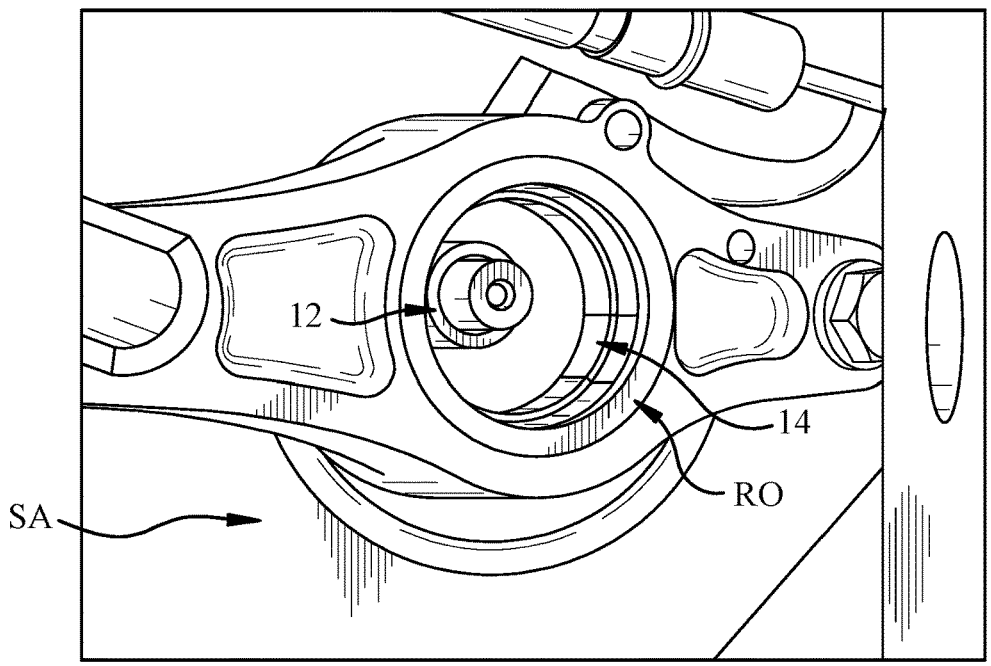
FIG. 2 schematically illustrates a swingarm bolted to a motorcycle frame at a pivot bolt, shown uncovered and with the dirt, rust and corrosion that develops within the recessed opening forming the pivot bolt area when the pivot bolt area and pivot bolt are uncovered during operation of the motorcycle.

As shown in FIGS. 3A-7, a motorcycle plug cover 10 is shown that securely engages a recessed opening RO in a motorcycle swingarm SA to cover the pivot bolt 12 and resist dirt, moisture and corrosion to the pivot bolt and recessed opening. The motorcycle plug cover 10 provides a functional and attractive addition to personalize a motorcycle swingarm. FIGS. 1 and 2 provide a comparison of a new swingarm SA with an uncovered pivot bolt 12 (FIG. 1) with a swingarm SA showing the rusty and corroded pivot bolt 12 and pivot bolt area 14 (FIG. 2) that may result when an uncovered recessed opening RO and pivot bolt 12 are subjected to road and weather conditions. While the present motorcycle plug cover 10 disclosed is configured for use in connection with 1997-2020 Harley Davidson Touring motorcycles as well as Trike models, one of ordinary skill in the art can readily adapt the plug cover for use with any motorcycle swingarm SA pivot bolt area 14.

The plug cover 10 shown in FIGS. 3A to 8 is a cup-shaped stainless steel body 20, preferably manufactured of 316L, or stainless steel having a lower carbon content. Due to its lower carbon content, 316L stainless steel is softer, and enables improved machinability, weldability, and corrosion resistance. The motorcycle plug cover of 316L stainless steel may be readily welded without difficulty, and is less vulnerable to corrosion or other weakening of the weld bond. The malleability of the cup-shaped body of 316L stainless steel means the plug cover may be readily formed with the necessary grooves and shapes without cracking or breaking, including the addition of a decorative design 30, and will maintain its corrosion resistance.

Figure 5:
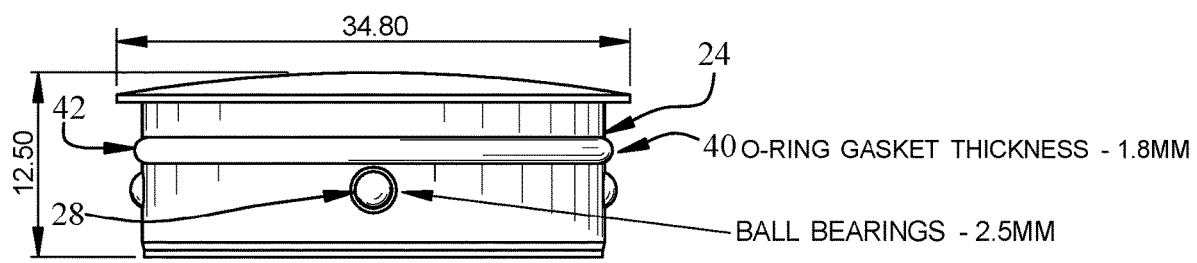
FIG. 5 schematically illustrates a side view of the motorcycle plug cover of FIGS. 3A and 3B, showing the spring ball plungers engaged through openings formed in the cylindrical wall of the plug cover body, and the O-ring gasket engaged within a groove in the cylindrical wall.
Figure 7:
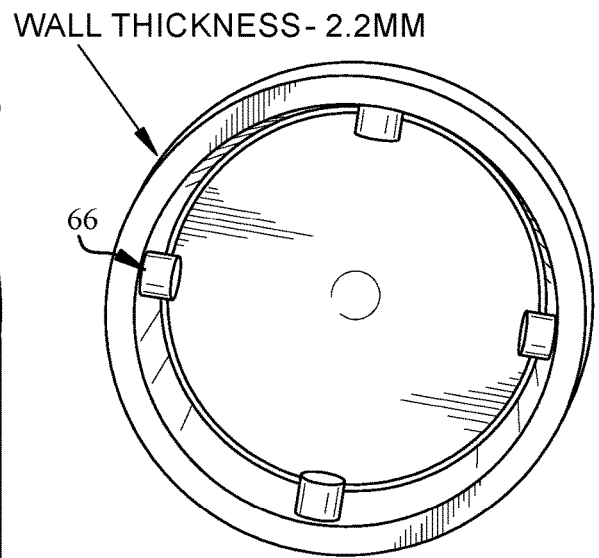
FIG. 7 illustrates a bottom plan view of the motorcycle plug cover of FIG. 3B.
Figure 8:
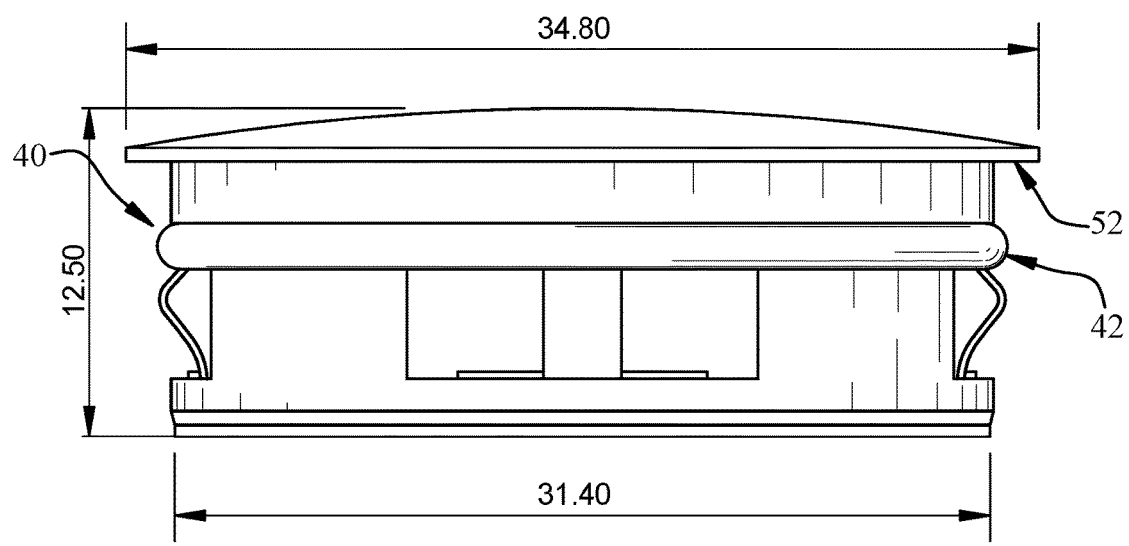
FIG. 8 schematically illustrates an alternate embodiment of the motorcycle plug cover having an O-ring gasket and leaf spring tensioners secured through openings formed through the cylindrical wall of the plug cover body.

The plug cover body 20 has an external diameter of approximately 31.40 mm, and a cylindrical wall 22 with a thickness of approximately 2.2 mm, as shown in FIG. 7. At least one groove 24 is formed within an external surface 26 of the cylindrical wall 22 for receiving engagement with at least one rubber O-ring gasket 40. The preferred groove 24 has a rectangular cross-sectional configuration. However, the groove 24 may be provided with a V-shaped or semicircular cross-sectional configuration, or any geometry for engaging and retaining the O-ring 40 as shown in FIGS. 3B, 5 and 8. Additional grooves with additional O-rings may also be provided in the cylindrical wall 22 in the event additional moisture resistance is desired.

Figure 4:
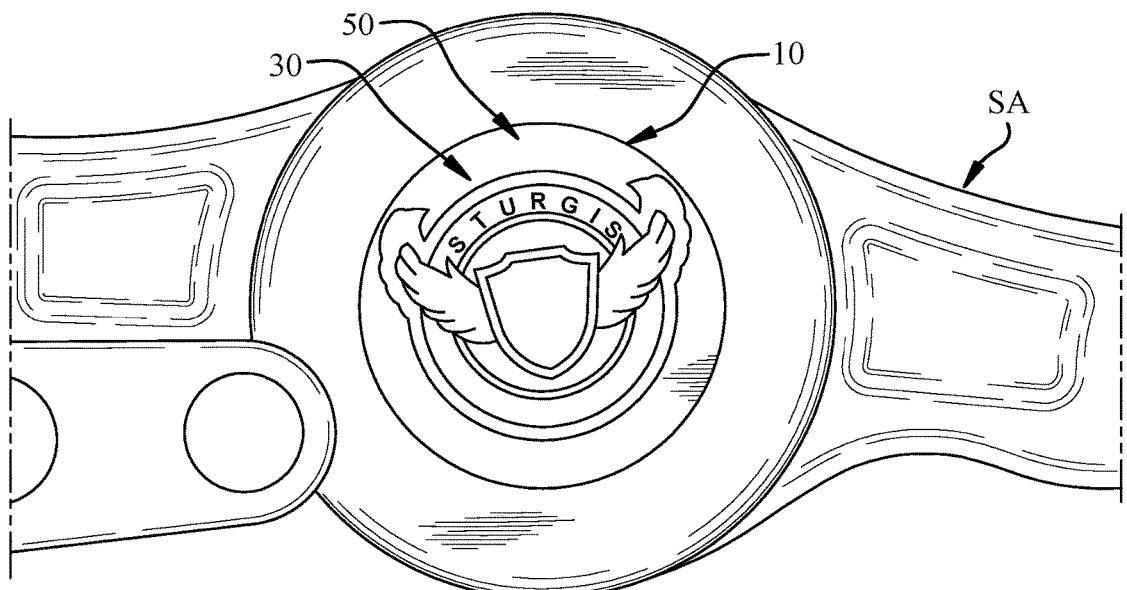
FIG. 4 illustrates a front view of a swingarm with a motorcycle plug cover engaged within the recessed opening of the pivot bolt area, the plug cover having a decorative logo design on the curved external cap surface of the plug cover.

The plug cover body 20 also a curved external cap surface 50 having a diameter of approximately 34.80 mm. An edge 52 of the curved external cap surface 50 extends beyond the cylindrical wall 22 and beyond an external surface 42 of the O-ring 40 when engaged within the groove 24 in the cylindrical wall. As shown in FIG. 4, the edge 52 of the curved external cap surface 50 extends away from the cylindrical wall 22 approximately 3.4 mm to cover the recessed opening RO, pivot bolt 12 and pivot bolt area 14 when the plug cover 10 is engaged with the recessed opening.

The plug cover 10 is securely engaged and retained within the recessed opening RO of the motorcycle swingarm SA by a plurality of metal springs. While a variety of leaf springs or other tension springs may be employed, stainless steel spring ball plungers 60 are preferred. The spring ball plungers 60 comprise a cup-shaped cylindrical plunger body 62, approximately 5 mm in length, having an internal spring biasing a ball bearing 64, having a diameter of approximately 2.5 mm, out one end of the plunger body 62. Each cylindrical plunger body 62 of the spring ball plunger is welded 66 within an opening 28 formed through the cylindrical wall 22 of the plug cover body 20. At least two spring ball plungers 60 should be provided extending from opposite sides of the plug cover cylindrical wall 22 to secure and retain the plug cover within the swingarm recessed opening. However, in the preferred embodiment four spring ball plungers 60 are welded in position through and within the cylindrical wall, with each located opposite another plunger, as shown in FIGS. 3B, 5 and 7. The spring ball plungers 60, together with the O-ring gasket 40, ensure that the plug cover 10 remains securely engaged within the recessed opening RO of the swingarm SA to resist dirt, grime and moisture from moving past the cap surface 50 and into the recessed opening of the pivot bolt area 14.

The curved external cap surface 50 of the stainless steel plug cover 10 may also be provided with any desired decorative design 30. The external cap surface 50 is curved to form a shallow dome-shaped cover as the closed surface of the cup-shaped body. The shallow curvature of the external cap surface 50 directs moisture off and away from the plug cover 10. The height of the plug cover 10 from the tallest part of the curved external cap surface 50 to the bottom of the plug cover body 20 is approximately 12.5 mm.

Figure 3A:
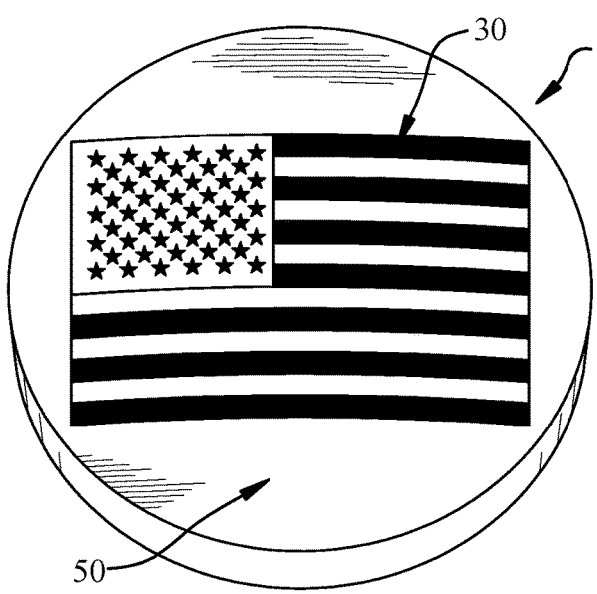
FIG. 3A illustrates a top perspective view of a motorcycle plug cover having a decorative flag design on the curved external cap surface of the plug cover.
Figure 3B:
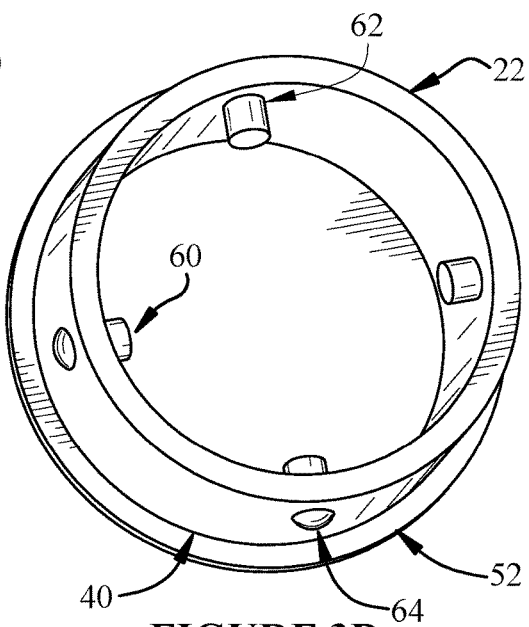
FIG. 3B illustrates a bottom perspective view of the motorcycle plug cover of FIG. 3A showing the spring ball plungers welded to and engaged through the cylindrical wall of the plug cover body, and the O-ring gasket.
Figure 6:
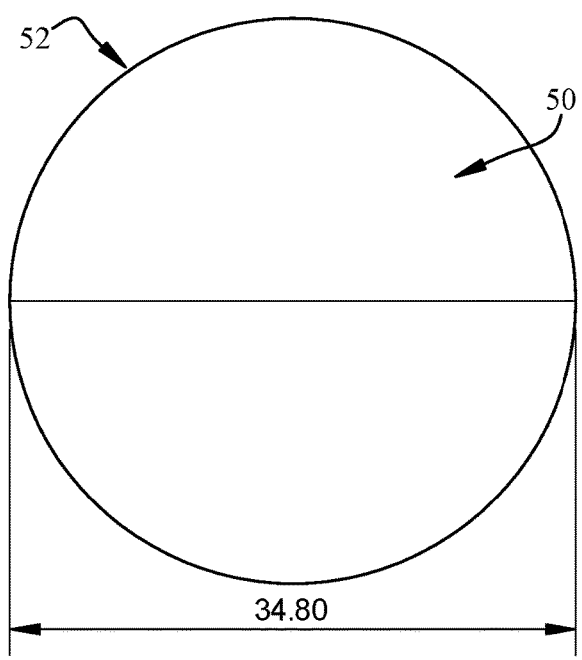
FIG. 6 schematically illustrates a top plan view of the motorcycle plug cover of FIG. 5.

While a plain or undecorated surface appearance may be provided on the external curved cap surface 50, as schematically shown in FIG. 6, any desired motorcycle logo or other preferred personalized design, shown in FIG. 4, including color designs using an enamel process, shown in FIG. 3A, are also possible. Such personalized aftermarket accessories are highly desirable to avoid motorcycle enthusiasts wishing to personalize features of their motorcycles.

In an alternate embodiment of the plug cover 10, shown in FIG. 8, the plug cover is retained within the recessed opening using a plurality of leaf spring tensioners 61 formed through rectangular openings 29 formed in the cylindrical wall 22, the and an O-ring gasket.

Although the device of the present application have been described in detail sufficient for one of ordinary skill in the art to practice the invention, it should be understood that various changes, substitutions and alterations may be made without departing from the spirit or scope of the device as defined in the attached claims. Moreover, the scope of the present device is not intended to be limited to the specific embodiments described here, which are provided by way of example. As one of ordinary skill in the art will readily appreciate from the disclosure of the present device and embodiments, other components presently existing or later to be developed that perform substantially the same function to achieve substantially the same result as those of the corresponding embodiments described here, may be utilized according to the present application. Accordingly, the appended claims are intended to include within their scope such other devices and components.

I claim:

1. A motorcycle swingarm bolt cover comprising,
a cup-shaped metal body having a cylindrical wall with at least one continuous annular groove for receiving engagement with at least one O-ring gasket, and a curved external cap surface with an edge extending beyond the cylindrical wall and beyond an external surface of the O-ring gasket when engaged within the at least one continuous annular groove in the cylindrical wall;
at least two spring openings are formed through the cylindrical wall and on opposite sides of the cylindrical wall, each receiving and engaging a metal spring ball plunger having a housing which is welded within a spring opening; and
the cup-shaped metal body having a curved external cap surface.

2. The motorcycle swingarm bolt cover of claim 1 further comprising, four metal spring ball plungers having housings engaged through and welded within spring openings formed through the cylindrical wall and arranged in opposing pairs on opposite sides of the cylindrical wall.

3. The motorcycle swingarm bolt cover of claim 1, wherein the curved external cap surface is provided with a decorative design.

4. The motorcycle swingarm bolt cover of the claim 2 or 3, wherein the cup-shaped metal body is stainless steel.

5. The motorcycle swingarm bolt cover of claim 4, wherein the cup-shaped metal body is 316L stainless steel.

6. The motorcycle swingarm bolt cover of claim 5, wherein the decorative design includes enamel color designs.

7. A motorcycle plug cover comprising,
   a cup-shaped stainless steel body having a cylindrical wall with at least one continuous annular groove for receiving engagement with at least one rubber O-ring gasket, and a curved external cap surface with an edge extending beyond the cylindrical wall and beyond an external surface of the rubber o-ring gasket when engaged within the at least one continuous annular groove in the cylindrical wall;
   at four spring openings are formed through the cylindrical wall arranged in pairs and on opposite sides of the cylindrical wall, each for receiving and engaging a stainless steel spring ball plunger which is welded within one of the four spring opening; and
   the cup-shaped stainless steel body having a curved external cap surface supporting a decorative design.

8. The motorcycle plug cover of claim 7, wherein the cup-shaped stainless steel body is 316L stainless steel.

9. The motorcycle plug cover of claim 8, wherein the decorative design includes enamel color designs.

\* \* \* \* \*